(12) United States Patent
Guddati et al.

(10) Patent No.: US 10,451,399 B2
(45) Date of Patent: Oct. 22, 2019

(54) METHODS AND SYSTEMS FOR NON-DESTRUCTIVE ESTIMATION OF A LENGTH OF A MEMBER

(71) Applicant: North Carolina State University, Raleigh, NC (US)

(72) Inventors: Murthy N. Guddati, Raleigh, NC (US); Vivek Samu, Raleigh, NC (US)

(73) Assignee: North Carolina State University, Raleigh, NC (US)

( * ) Notice: Subject to any disclaimer, the term of this patent is extended or adjusted under 35 U.S.C. 154(b) by 293 days.

(21) Appl. No.: 15/587,469

(22) Filed: May 5, 2017

(65) Prior Publication Data

US 2017/0322011 A1 Nov. 9, 2017

Related U.S. Application Data

(60) Provisional application No. 62/332,098, filed on May 5, 2016.

(51) Int. Cl.
*G01B 5/02* (2006.01)

(52) U.S. Cl.
CPC ...................... *G01B 5/02* (2013.01)

(58) Field of Classification Search
CPC . G01B 5/02; G01S 17/32; G01H 1/00; G01H 17/00
See application file for complete search history.

(56) References Cited

U.S. PATENT DOCUMENTS 3,946,598 A * 3/1976 Towne ...................... E02D 1/02
73/594
5,996,414 A 12/1999 Mercado
(Continued)

FOREIGN PATENT DOCUMENTS

| CN | 100494888 | 6/2009 |
| CN | 102071705 | 5/2011 |
| CN | 103088849 | 5/2013 |

OTHER PUBLICATIONS

ASCE 2017 Infrastructure Report Card: A Comprehensive Assessment of America's Infrastructure, available at http://www.infrastructurereportcard.org/wp-content/uploads/2017/04/2017-IRC-Executive-Summary-FINAL-FINAL.pdf.
(Continued)

*Primary Examiner* — Ian J Lobo
(74) *Attorney, Agent, or Firm* — Meunier Carlin & Curfman LLC (57) ABSTRACT

An example non-destructive method for estimating a length of a member, which may be embedded, is described herein. The method can include impacting the member, recording a respective signal at each of a plurality of sensors attached to the member, and transforming the respective signals into a frequency domain. The respective signals can include dispersive waves generated by the impact. The method can also include determining an effective wavenumber of dispersive wave propagation based on the respective frequency-domain signals, determining theoretical wavenumber of dispersive wave propagation using a dispersion relation for the member, and estimating the length of the member based on the relationship between the effective wavenumber of dispersive wave propagation and theoretical wavenumber of dispersive wave propagation.

20 Claims, 6 Drawing Sheets

(56) References Cited

U.S. PATENT DOCUMENTS

| | | | | |
|---|---|---|---|---|
| 6,718,648 | B1* | 4/2004 | Knight | E02D 33/00 |
| | | | | 33/1 H |
| 7,152,467 | B2* | 12/2006 | Slaughter | E02D 1/022 |
| | | | | 73/152.58 |
| 7,832,280 | B2 | 11/2010 | Hayes | |

OTHER PUBLICATIONS

Chao, "An Experimental Model for Non-destructive Evaluation on Pile Foundations using Guided Wave Approach." PhD diss., Northwestern University, 2002, 336 pages.

Davis, "Nondestructive evaluation of existing deep foundations", Journal of performance of constructed facilities, vol. 9, No. 1, 1995, pp. 57-74.

Davis, et al., "From theory to field experience with the non-destructive vibration testing of piles." Proceedings of the Institution of Civil Engineers, vol. 57, No. 4, 1974, pp. 571-593.

Douglas, et al., "Determining Length of Installed Timber Pilings by Dispersive Wave Propagation Methods.", Research Project No. 23241-92-2, 1993, 308 pages.

Farid, "Prediction of unknown deep foundation lengths using the Hilbert Haung [sic] Transform (HHT)." HBRC Journal, vol. 8, No. 2, 2012.

Finno, "1-D wave propagation techniques in foundation engineering." The Art of Foundation Engineering Practice Congress, ASCE 2010, pp. 260-277.

Gorzelanczyk, et al., "Non-destructive evaluation of the concrete prefabricated pile length using impulse response S'MASH." Institute of Building Engineering, Wroclaw University of Technology, Wroclaw, 2008, 8 pages.

Hanifah, "A theoretical evaluation of guided waves in deep foundations." PhD Thesis. Northwestern University. Evaneston. IL., 1999, 236 pages.

Hertlein, et al., "Assessment and reuse of old foundations." Transportation Research Record: Journal of the Transportation Research Board 1736, 2000, pp. 49-52.

Hussein, et al., "Determination of Pile Lengths under Existing Structures." Proceedings, 17th Annual Members Conference of the Deep Foundations Institute, New Orleans, 1992, pp. 195-206.

Khan, et al., "Determining Unknown Bridge Foundation Depth by Resistivity Imaging Method", GeoCongress, Geotechnical Special Publication, 2012, pp. 275-284.

Kuo, et al., "Dynamic Models of Piled Foundations." Applied Mechanics Reviews, vol. 65, No. 3, 2013, 031003, 9 pages.

Levy, J. F. "Sonic pulse method of testing cast-in-situ piles." Ground Engineering, 1970, pp. 17-19.

Lo, et al., "Non-destructive test for pile beneath bridge in the time, frequency, and time-frequency domains using transient loading." Nonlinear Dynamics, vol. 62, 2010, pp. 349-360.

Lugovtsova, et al., "Comparison of Three Different Methods for Pile Integrity Testing on a Cylindrical Homogeneous Polyamide Specimen." Journal of Physics: Conference Series, vol. 671, Jan. 2016, 012055.

Lynch, "Experimental verification of flexural guided waves in concrete cylindrical piles." PhD diss., Northwestern University, 2007, 474 pages.

Olson, "Determination of Unknown Bridge Foundation Depths with NDE Methods." First International Conference on Scour of Foundations, 2002, 17 pages.

Rausche, "Non-destructive evaluation of deep foundations." Proceedings: Fifth International Conference on Case Histories in Geotechnical Engineering, 2004, 9 pages.

Rausche, et al., "Dynamic determination of pile capacity." Journal of Geotechnical Engineering, vol. 111, No. 3, 1985, pp. 367-383.

Rausche, et al., "Non-Destructive Testing to Determine Unknown Pile Lengths Under Existing Bridges." First International Conference on Scour of Foundations, 2002, 12 pages.

Rausche, et al., "Pile Integrity by Low and High Strain Impacts." 1988, pp. 44-55.

Subhani, et al., "Determination of the embedded lengths of electricity timber poles utilising flexural wave generated from impacts." Australian Journal of Structural Engineering, vol. 14, No. 1, 2013, pp. 85-96.

Wang, "Theoretical evaluation of embedded plate-like and solid cylindrical concrete structures with guided waves." PhD diss., Northwestern University, 2004, 318 pages.

* cited by examiner

METHODS AND SYSTEMS FOR NON-DESTRUCTIVE ESTIMATION OF A LENGTH OF A MEMBER

CROSS-REFERENCE TO RELATED APPLICATIONS

This application claims the benefit of U.S. Provisional Patent Application No. 62/332,098, filed on May 5, 2016, entitled "METHODS AND SYSTEMS FOR NON-DESTRUCTIVE ESTIMATION OF A LENGTH OF A MEMBER," the disclosure of which is expressly incorporated herein by reference in its entirety.

BACKGROUND

The 2017 report card for America's Infrastructure by American Society of Infrastructure (ASCE) [1], reports that one in eleven of the nation's bridges are rated as structurally deficient and the average age of the nation's 614,387 bridges is 43 years. Also the Federal Highway Administration (FHWA) calculated that more than 39% of existing bridges have exceeded their 50-year design life and an additional 15% are between the ages of 40 and 49. Thus, the need for structural health monitoring of bridges in terms of maintenance, repair and rehabilitation is becoming very critical. Pile foundations are the most common type of deep foundations for bridges and are used for various conditions such as loose soil, large loads from structure, lack of space for shallow foundation. The capacity of a pile foundation is directly related to the embedded length. Reduction in the effective depth of the foundation especially due to scour may cause significant reduction in strength and thus compromises the safety of the structure. Hence it is beneficial to evaluate the effective embedded length of pile using nondestructive testing (NDT). There have been multiple NDT methods [2] developed for quality assurance of newly constructed pile foundations and evaluation of an existing foundation.

The terms nondestructive testing/nondestructive evaluation were first used in the context of pile foundations in the 1970's and can be traced back to two the work of Levy [3] and Davis and Dunn [4]. Levy described a mechanism used to test the condition of cast in-situ concrete piles using a sonic pulse transmitter and receiver. Davis and Dunn used electrodynamic vibrator placed on the head of the pile to produce sinusoidal waves of varied frequencies and the response was recorded using a transducer also attached to the top. The response was processed in the frequency domain to obtain information on the concrete quality and length, but the test was only capable of providing results on a comparative basis among a group of piles. This method became more prevalent after the advent of digital signal processing, starting with the work of Rausche et al. [5, 6]. The method evolved over time and is currently referred to as the pulse-echo, sonic-echo, or impulse-response method [7-12].

Each of the above methods may have a bit different formulation but are based on the same basic idea. The procedures constitute impacting the top of the pile and recoding the response on the top using a transducer. Travel time and wave velocity of longitudinal waves are used to obtain the length of the foundation. The data analysis requires an experienced user, and the accuracy of the results are dependent on the assumed velocity of the wave and thus there can be significant error introduced even before considering the experimental uncertainties. Additionally, a modified version of this test exists which is similar to the test by Davis and Dunn, where the impact force is also measured during the test to obtain mobility plots from which the pile length is estimated. This modified test requires a bit more expensive equipment than the pulse echo method, yet it has all the limitations discussed pertaining to it. Most importantly, this method cannot be used whenever the top of the pile is inaccessible, and thus it is predominantly used for newly constructed foundations.

The other class of tests NDT of pile foundations are borehole techniques, including cross hole sonic logging, single hole sonic logging, gamma-gamma logging and parallel seismic testing [13], as well as induction testing for steel piles. All these tests require either a borehole alongside the pile foundation or a preinstalled test pipe in the pile and also require expensive equipment along with an experienced user to interpret the results. Even though these techniques can be effective in select situations, using them to test a large group of piles is not practical. Thus, there is still a need for a quick and effective techniques.

The idea of using lateral impact inducing flexural waves, rather than the conventional longitudinal waves from the impact-echo method, was apparently first conceived by Holt and Douglas [14]. Lateral impact imparts most energy into bending waves that are dispersive in nature. The analysis of dispersive waves is more complicated than non-dispersive waves such as longitudinal waves; unfortunately longitudinal waves are not well-excited due to lateral impact and it is essential to deal with dispersive flexural waves. Holt and Douglas introduced the Short-Kernel Method (SKM) to process the response from dispersive flexural waves to obtain the travel time information, which is used to estimate the embedded length of the pile. SKM consists of choosing a kernel of a particular frequency, generally the dominant frequency and obtaining a cross correlation between the kernel and the signal. The plot of the cross correlation is known as the short kernel plot. This plot contains information about that particular frequency (frequency of the kernel) from the signal and the time difference between consecutive peaks is used to obtain the velocity of wave propagation. Two wave trains are generated on impact, one upward propagating and one downward propagating. The first peak in the plot is when the downward propagating wave passes the accelerometer. The second peak is when the upward propagating wave gets reflected from the top and propagates downwards, reaching the accelerometer. The length from the top of the pile to the accelerometer is known and with the time of travel calculated from the first two peaks, the wave velocity is computed for the free part of the pile. This velocity obtained was used for the embedded part of the pile, along with the travel time calculated from the next peak to find the embedded length of the pile. A similar procedure was followed to calculate the wave velocity between two accelerometers, which was then used to calculate the embedded length using the time of travel for the reflected wave. This approach is completely based on the time of travel and does not take into account the effect of the soil and changes in wave velocity for the free and the embedded parts. Also the peak picking can be complicated even for an experienced user.

Another signal processing technique based on combined time-frequency analysis (Hilbert Huang Transforms) was used for the dispersive flexural waves by Farid [15]. Subhani et al. [16] used a combination of SKM and continuous wavelet transform (CWT), which is another time-frequency analysis technique, to estimate the embedded lengths of electricity poles and observed significant error margins in both the cases, up to 43% in some cases. The application of CWT is more straightforward than SKM, and SKM requires more experience with the user. The more recent work by Lo et al. [17] compares results from time, frequency and time-frequency analysis, but has been done for longitudinal waves. All the above methods are purely based on signal processing tools and do not explicitly incorporate the dispersion properties of the waves.

SUMMARY

Described herein are methods and systems for estimating the length of a member (e.g., piles, rods, shafts, etc.), in a non-destructive manner. In some implementations, the member may be at least partially embedded, for example, in a formation. The methods and systems described herein facilitate quick and effective estimation of the length of the member (e.g., a pile foundation) with minimal user intervention.

An example non-destructive method for estimating a length of a member is described herein. The method can include impacting the member, recording a respective signal at each of a plurality of sensors attached to the member, and transforming the respective signals into a frequency domain. The respective signals can include dispersive waves generated by the impact. The method can also include determining an effective wavenumber of dispersive wave propagation based on the respective frequency-domain signals, determining a theoretical wavenumber of dispersive wave propagation using a dispersion relation for the member, and estimating the length of the member based on the relationship between the effective wavenumber of dispersive wave propagation and the theoretical wavenumber of dispersive wave propagation.

Additionally, the relationship between the effective wavenumber of dispersive wave propagation and the theoretical wavenumber of dispersive wave propagation can be approximately periodic on a plurality of scales.

Alternatively or additionally, estimating the length of the member can include calculating a cycle period and a wiggle period based on the relationship between the effective wavenumber of dispersive wave propagation and the theoretical wavenumber of dispersive wave propagation. For example, the cycle period and the wiggle period can be calculated from a plot of the relationship between the effective wavenumber of dispersive wave propagation and the theoretical wavenumber of dispersive wave propagation. The length can be estimated based on the cycle period, the wiggle period, and a distance between the sensors. The cycle period is a period between groups of wiggles, and the wiggle period is a period between wiggle peaks. In addition, the cycle period is related to a distance between the sensors, and the wiggle period is related to a distance between a tip of the member and at least one of the sensors.

Alternatively or additionally, the effective wavenumber of dispersive wave propagation can be determined from a phase measure related to a real wavenumber and a distance between the sensors. Example phase measures include, but are not limited to, phase difference, sum of phases, or other combinations of phases of the respective signals.

Alternatively or additionally, the dispersion relation for the member can be a mathematical model such as one of a Bernoulli-Euler beam model, a Timoshenko beam model, or a waveguide model.

Alternatively or additionally, the member can be at least partially embedded, for example, in a formation. Optionally, the dispersion relation for the embedded member can account for a formation at least partially surrounding the embedded member.

Alternatively or additionally, at least one of the sensors can be an accelerometer, a geophone, or any device that measures acceleration, velocity or displacement.

An example system for non-destructive estimation of a length of a member is also described herein. The system can include an impact hammer, a plurality of sensors attached to the member, and a computing device operably connected to the sensors. The computing device can include a processor and a memory operably connected to the processor, where the memory has computer-executable instructions stored thereon. The computing device can be configured to receive a respective signal recorded at each of the sensors, and transform the respective signals into a frequency domain. The respective signals can include dispersive waves generated by the impact. The computing device can be further configured to determine an effective wavenumber of dispersive wave propagation based on the respective frequency-domain signals, determine a theoretical wavenumber of dispersive wave propagation using a dispersion relation for the member, and estimate the length of the member based on the relationship between the effective wavenumber of dispersive wave propagation and the theoretical wavenumber of dispersive wave propagation.

Alternatively or additionally, the system can be portable.

An example non-transitory computer-readable recording medium having computer-executable instructions for non-destructive estimation of a length of a member is also described herein. The non-transitory computer-readable recording medium, when executed by a computer, cause the computer to receive a respective signal recorded at each of a plurality of sensors attached to the member, transform the respective signals into a frequency domain, determine an effective wavenumber of dispersive wave propagation based on the respective frequency-domain signals, determine a theoretical wavenumber of dispersive wave propagation using a dispersion relation for the member, and estimate the length of the member based on the relationship between the effective wavenumber of dispersive wave propagation and the theoretical wavenumber of dispersive wave propagation.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

DETAILED DESCRIPTION

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. Ranges may be expressed herein as from "about" one particular value, and/or to "about" another particular value. When such a range is expressed, an aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. While implementations will be described for estimating the length of a pile foundation, it will become evident to those skilled in the art that the implementations are not limited thereto, but are applicable for estimating the length of other members (e.g., piles, rods, shafts, etc.).

Most conventional approaches for estimating length of embedded piles are based on travel time and velocity of the wave determined using the travel time. Further, the effect of soil is assumed to be negligible in the conventional approaches. A signal processing technique called Effective Dispersion Analysis of Reflections (EDAR) is described herein. EDAR extracts the length information by considering the physics of the wave dispersion, which have been ignored by conventional techniques.

The pulse-echo and time travel based methods described in the background section are based on one-dimensional (1D) wave propagation theory. In a more general sense, waves propagating inside the pile are guided waves owing to the three dimensional nature and reflections from all the boundaries of the pile. Various works in Northwestern University, by Finno [18], Hanifah [19], Chao [20], Wang [21] and Lynch [22], have considered the pile as a cylindrical wave guide to obtain the longitudinal, torsional and flexural modes of vibrations and the corresponding dispersion relation. It has been shown that the predominant modes in longitudinal and flexural waves are the first modes (namely L(0,1) and F(1,1)), which gives more confidence to use the 1D wave propagation model. While using the guided wave approach may be more accurate in capturing the complete physics of the problem, it is computationally expensive. A simplified 1D model is needed, but informed by more sophisticated models.

Figure 1:
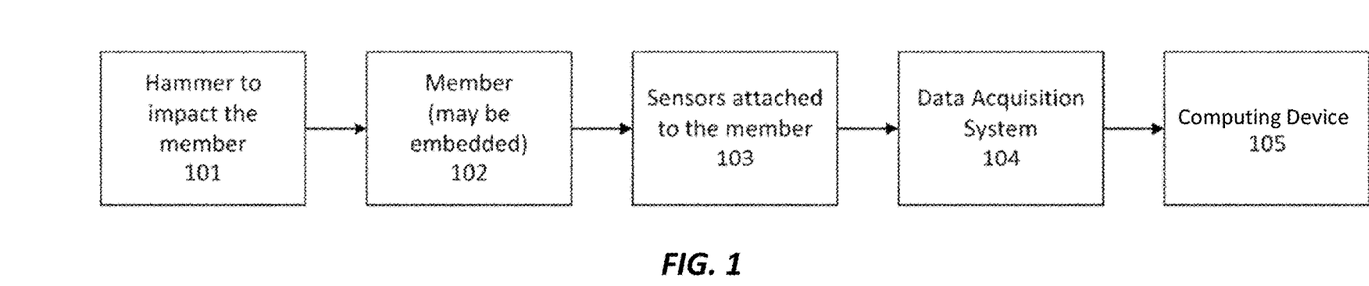
FIG. 1 is a block diagram illustrating an example system for non-destructive estimation of a length of a member.
Figure 2:
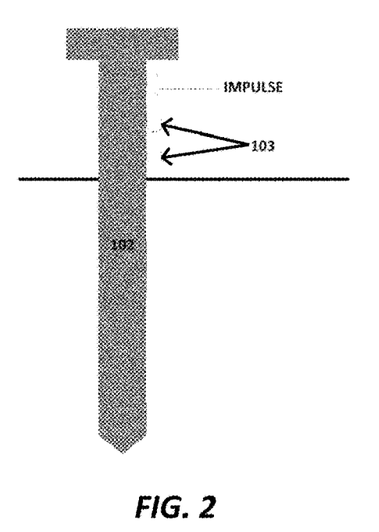
FIG. 2 is a diagram illustrating example sensors arranged on an embedded member.

Referring now to FIG. 1, a block diagram illustrating a system for non-destructive estimation of a length of a member is shown. The system can include an impact hammer 101 for impacting a member 102, a plurality of sensors 103 (e.g., accelerometers) attached to the member 102 (e.g., as shown in FIG. 2), a data acquisition unit (DAQ) 104, and a computing device 105. It should be understood that accelerometers are provided only as example sensors. This disclosure contemplates that the sensors 103 can be any device that measures acceleration, velocity, and/or displacement. Example sensors include, but are not limited to, accelerometers and geophones. The member 102 can optionally be at least partially embedded, for example, in a formation (e.g., a pile foundation). An embedded pile is shown in FIG. 2. Referring again to FIG. 1, the computing device 105 can be computing device 600 of FIG. 6, such as a laptop computer, tablet computer, and/or other mobile computing device, for example. The sensors 103, DAQ 104, and the computing device 105 can be operably coupled through one or more communication links. This disclosure contemplates the communication links are any suitable communication link. For example, a communication link can be implemented by any medium that facilitates data exchange between the sensors 103, the DAQ 104, and the computing device 105 including, but not limited to, wired, wireless and optical links.

The member 102 (e.g., a pile) is impacted laterally using the impact hammer 101, and the flexural waves generated on lateral impact are recorded by the sensors 103 attached to the member 102. The impact hammer 101 can be any object used for striking the member 102 to generate flexural waves. EDAR requires at least two sensors along the length of the pile. Although the examples described herein use two sensors, it should be understood that more than two sensors can optionally be used, for example, to increase the redundancy in measurements and thus the reliability of estimated length. The sensors 103 can be accelerometers such as piezoelectric sensors, which can measure relative acceleration of the point to which they are attached. For example, single axis accelerometers from PCB PIEZOTRONICS of Depew, N.Y. were used in the examples provided herein. The sensors 103 are connected to the DAQ 104, which acquires and converts the analog electrical signals from the accelerometers to digital signals, which can be read by the computing device 105. The acquired data can then be processed (e.g., by the computing device 105) to obtain the length of the member 102.

A signal processing technique called Effective Dispersion Analysis of Reflections (EDAR) incorporates the dispersion properties of the underlying physical system to estimate the length of a member. For example, EDAR can be used to estimate the embedded length of a pile foundation. Owing to the physical nature of the waves generated, Bernoulli-Euler (BE) beam theory has been employed. As described below, this disclosure contemplates using a dispersion relation other than that from BE beam theory with EDAR.

One dimensional Bernoulli-Euler beam theory is used to illustrate the theory behind EDAR. The standard dispersion relation relates the wavenumber or wavelength to the frequency of a physical system, which can be used to obtain phase and group velocities. EDAR operates in the wavenumber domain. Assuming a beam with Young's modulus E, Density $\rho$, Moment of Inertia I and cross sectional area A, the fourth order equation governing wave propagation without any external forces is given by $$EI\frac{\partial^4 u}{\partial x^4} + \rho A \frac{\partial^2 u}{\partial t^2} = 0, \qquad 1$$

where u is the transverse displacement. The general solution for the equation is given by $$u = Ce^{ikx - i\omega t} \quad \quad 2$$

where ω is the frequency and k is the wavenumber. Substituting the general solution in the governing equation, the dispersion relation can be obtained.

$$EIk^4 - \rho A \omega^2 = 0 \quad \quad 3$$

$$\Rightarrow k = \sqrt{\frac{\omega}{cr}} \quad \quad 4$$

where $c = \sqrt{E/\rho}$ is the bar wave velocity and $r = \sqrt{I/A}$ is the radius of gyration. Equation 3 or 4 is the dispersion relation for a Bernoulli-Euler beam and is a component in defining the theoretical wavenumber as described below.

Phase velocity is defined as the ratio of the frequency to wavenumber, and the group velocity is defined as the derivative of the frequency with respect to wavenumber. Graphically at any point in the dispersion curve, phase velocity is given by the secant and group velocity is the tangent to the curve. They are given by the following expressions for a Bernoulli-Euler beam.

$$C_{phase} = \frac{\omega}{k} = \sqrt{\omega r c} \quad \quad 5$$

$$C_{group} = \frac{d\omega}{dk} = 2\sqrt{\omega r c} \quad \quad 6$$

It can be observed from the above expressions that the phase and group velocities are functions of the frequency and thus are dispersive in nature, i.e., each frequency travels at a different velocity. This causes distortion of the initial waveform making direct application of travel time based approach not viable, thus requiring some signal processing technique to analyze the data.

EDAR methodology is based on obtaining two modified characteristics of wave propagation which are called the effective wavenumber (sometimes referred to herein as "effective wavenumber of dispersive wave propagation") and the theoretical wavenumber (sometimes referred to herein as "theoretical wavenumber of dispersive wave propagation"). The general definition for each of the quantity and their specific form for BE beam model are shown as follows.

Effective wavenumber is related to the actual wavenumber from the experimental data, e.g., the respective signals measured by the sensors (e.g., sensors 103 in FIGS. 1 and 2). The effective wavenumber is defined as the imaginary part of natural logarithm of the ratio of the response in the frequency domain obtained at two accelerometer locations (e.g., by the sensors 103 of FIGS. 1 and 2) in a nondestructive test. Assuming $U_1(t)$ and $U_2(t)$ are the responses recorded at the accelerometer locations, and their Fourier transforms are given by $u_1(\omega)$ and $u_2(\omega)$ respectively, the effective wavenumber is given by:

$$k_e = \text{Imag}\left(\log\left(\frac{u_2(\omega)}{u_1(\omega)}\right)\right) \quad \quad 7$$

Note that the effective wavenumber is essentially the phase difference between the responses recorded at the two accelerometer locations. This disclosure contemplates that effective wavenumber can be determined from the respective signals recorded by the sensors (e.g., sensors 103 in FIGS. 1 and 2). For example, effective wavenumber is reflected in the phases of the respective signals. Effective wavenumber can be a phase measure including, but not limited to, phase shift, actual phase, or combinations of phases of the respective signals. The cycle period described below can be obtained by defining effective wavenumber as phase difference (e.g., using equation 7) of the respective signals, and the wiggle period described below can be obtained by defining the effective wavenumber as the phase difference, actual phase, phase sum, or combinations of phases of the respective signals.

The solution for the governing equation for a BE beam given in equation 1 in frequency domain is given by $$u(x) = C_1 e^{jk_1 x} + C_2 e^{-ik_1 x} + C_3 e^{k_2 x} + C_4 e^{-k_2 x} \quad \quad 8$$

where $k_1, -k_1, i k_2, -i k_2$ are the roots of equation 3. The real roots correspond to propagating waves and the imaginary roots correspond to evanescent waves. Evanescent waves decay fast and their effect due to reflection from the pile tip can be ignored.

The idea of effective wavenumber is explained in a simpler context using a single propagating wave travelling towards the pile tip and being reflected back. In the real case scenario, there are going to be multiple reflections of this propagating wave generated on impact both from the top and bottom of the pile, but the effects of these reflections are going to be the same as of a single reflection.

Figure 3:
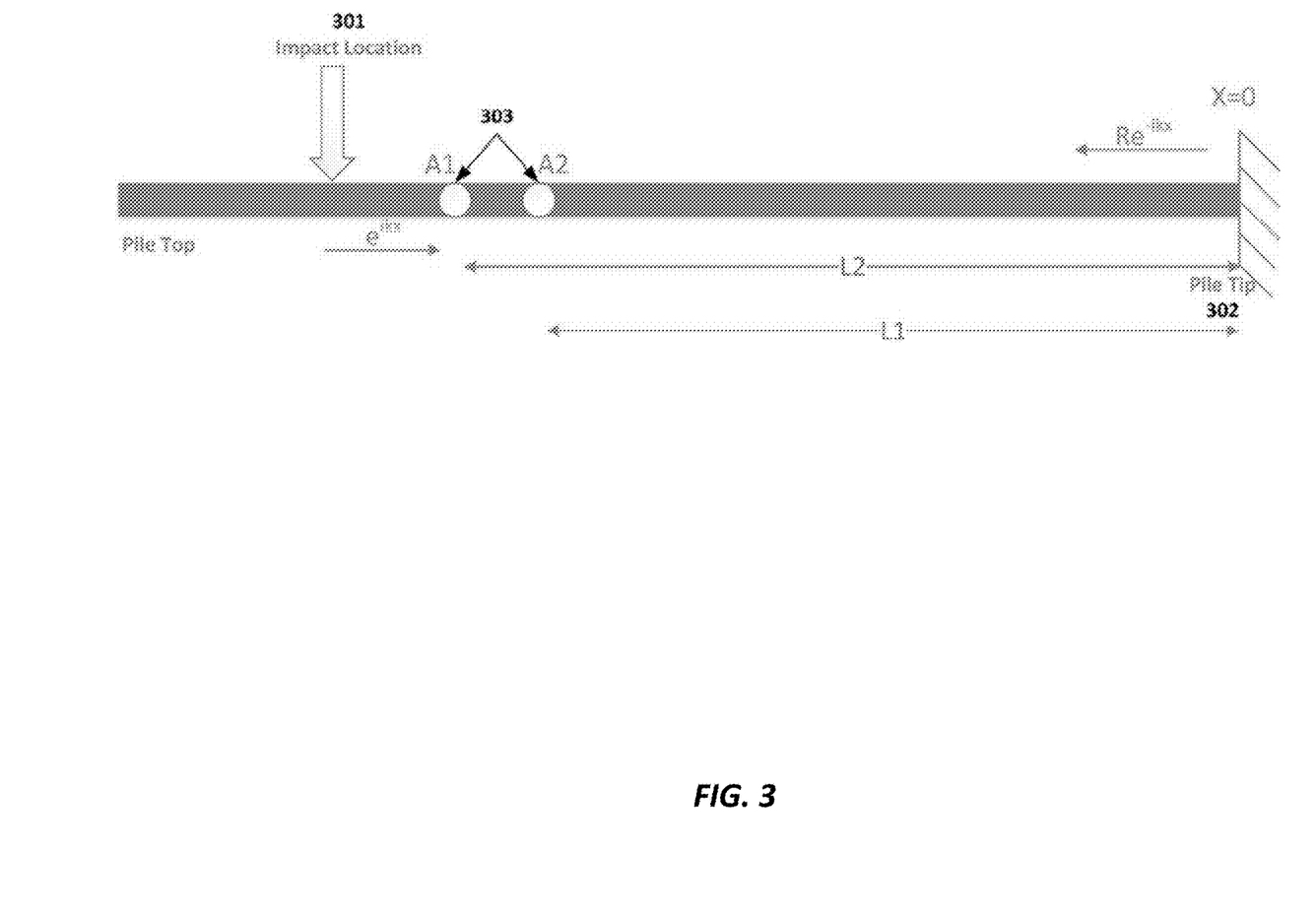
FIG. 3 is a diagram illustrating an example propagating wave in a beam.

Referring now to FIG. 3, an example propagating wave in a beam is shown. A time-harmonic wave propagating to the right from the location of impact 301 is represented by $e^{ikx}$ and the reflected wave propagating to the left from the pile tip 302 is represented by $Re^{-ikx}$, where R is the reflection coefficient on the pile tip (here time-variation of $e^{i\omega t}$ is implicitly assumed). The reflection coefficient R depends on the boundary condition on the right, and varies between 1 when completely free to $-1$ when completely fixed.

Thus, the total displacement at any point in the beam between the impact location 301 and the pile tip 302 after one reflection is given by equation 9.

$$u = e^{ikx} + Re^{-ikx} \quad \quad 9$$

The response at the accelerometer locations 303 at distances $L_1$ and $L_2$ from the pile tip 302 are given by equation 10.

$$u(L_1) = u_2 = e^{ikL_1} + Re^{-ikL_1}$$

$$u(L_2) = u_1 = e^{ikL_2} + Re^{-ikL_2} \quad \quad 10$$

Figure 4:
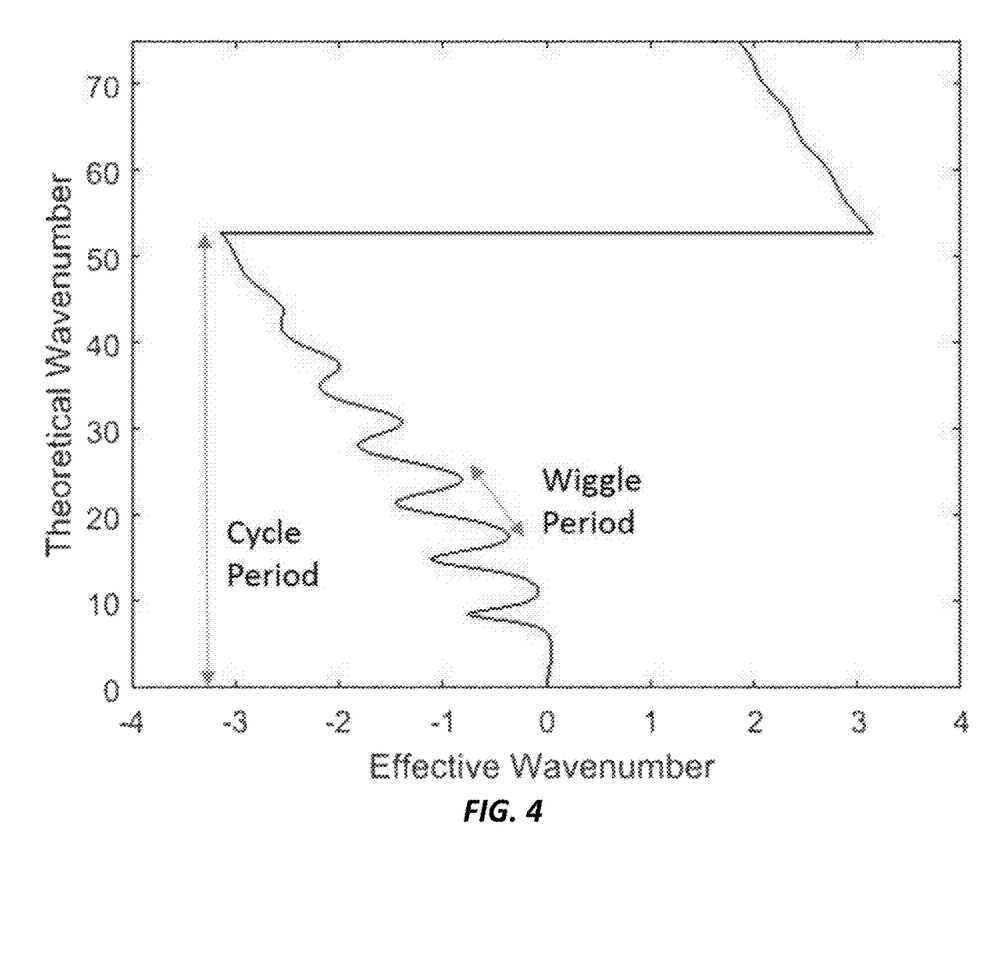
FIG. 4 is an example Effective Dispersion Analysis of Reflections (EDAR) plot obtained from synthetic data.

Using the above displacements and equation 7, the effective wavenumber can be obtained. Additionally, the effective wavenumber is periodic at two different scales related to spacing between the two accelerometers and the distance from each of the sensors to the pile tip. This periodicity is used to obtain the length of the pile. Referring now to FIG. 4, an EDAR plot obtained from synthetic data shows the two scales of periodicity, named cycle period and wiggle period. The cycle period and the wiggle period are labeled in FIG. 4. The abscissa is the effective wavenumber which is obtained from the measured response, and the ordinate is the theoretical wavenumber which is obtained using the dispersion relation (Equation 4). In other words, the relationship between effective wavenumber and theoretical wavenumber is periodic on a plurality of scales.

Further analysis that follows explain the cycle and wiggle periods. Starting with the ratio of the two displacements:

$$\frac{u_2}{u_1} = \left(\frac{e^{2ikL_1} + R}{e^{2ikL_2} + R}\right)e^{ik(L_2-L_1)}. \qquad 11$$

Taking logarithm of the ratio to find the experimental wavenumber, $$\log\left(\frac{u_2}{u_1}\right) = ik(L_2 - L_1) + \underbrace{\log(e^{2ikL_1} + R)}_{a} - \underbrace{\log(e^{2ikL_2} + R)}_{b}. \qquad 12$$

To find the imaginary part of the equation 12, a and b are expanded separately as follows:

$$a = \log(e^{2ikL_1} + R) = \log(\cos(2kL_1) + R + i\sin(2kL_1)) \qquad 13$$

Thus the imaginary part of a is the phase angle of the bracketed term:

$$\text{Imag}(a) = \tan^{-1}\left(\frac{\sin(2kL_1)}{\cos(2kL_1) + R}\right). \qquad 14$$

Similarly the imaginary part of b is given by:

$$\text{Imag}(b) = \tan^{-1}\left(\frac{\sin(2kL_2)}{\cos(2kL_2) + R}\right). \qquad 14$$

Therefore, the effective wavenumber is given by:

$$k_e = \underbrace{k(L_2 - L_1)}_{c_1} + \underbrace{\tan^{-1}\left(\frac{\sin(2kL_1)}{R + \cos(2kL_1)}\right)}_{c_2} - \underbrace{\tan^{-1}\left(\frac{\sin(2kL_2)}{R + \cos(2kL_2)}\right)}_{c_3}. \qquad 16$$

The periodic nature of $k_e$ can be explained using the terms $c_1$, $c_2$ and $c_3$. In wavenumber (k) domain, the period of $c_1$ is dependent on $\Delta L$ ($=L_2-L_1$) which is the distance between the two accelerometers (e.g., the sensors 103 of FIGS. 1 and 2). The period of $c_2$ and $c_3$ are dependent on lengths $L_1$ and $L_2$ (e.g., respective distances $L_1$ and $L_2$ between the accelerometer locations and the pile tip as shown in FIG. 3) respectively and are given by:

$$\text{Period}(c_1) = \frac{\pi}{\Delta L} \qquad 17$$

$$\text{Period}(c_2) = \frac{\pi}{L_1} \qquad 18$$

$$\text{Period}(c_3) = \frac{\pi}{L_2}. \qquad 19$$

It can be observed from equation 16 that the effective wavenumber is related to the theoretical wavenumber shown in equation 4, and the periodicity of each of the terms are defined in the wavenumber domain. Thus, plotting the effective wavenumber as a function of the theoretical wavenumber, the spacing between the wiggle peaks becomes approximately uniform. The plot of effective wavenumber and theoretical wavenumber is called the EDAR plot and can be used in calculating the cycle and wiggle periods.

From equation 16, it can be shown that the slope of the effective wavenumber is governed by $c_1$ and the wiggles are jointly governed by $c_2$ and $c_3$. As described above, the period of repetition of the group of wiggles is named as the cycle period and the period of the wiggles is named as the wiggle period. The cycle period and wiggle period can be obtained experimentally and they depend on $\Delta L$ and $L_1$, $L_2$ respectively. The cycle and wiggle periods are given by equations 20 and 21.

$$\text{Cycle period} = \frac{\pi}{\Delta L} \qquad 20$$

$$\text{Wiggle period} = LCM \text{ of } \frac{\pi}{L_1} \text{ and } \frac{\pi}{L_2} \qquad 21$$

The above definition of the wiggle period is valid only for integer values of $\pi/L_1$ and $\pi/L_2$. An estimate for the length can be found using the wiggle period and in cases where the accelerometers are placed close to each other, the estimate has less error.

For the BE beam, the dispersion relation shown in equation 4 is used to obtain the theoretical wavenumber. The material constants are dropped in the definition of the theoretical wavenumber facilitating the estimation of length without any knowledge of the constants.

$$k_{th} = \sqrt{\omega} \qquad 22$$

The cycle period ($c_p$) measured from the EDAR plot is function of the distance between the sensors ($\Delta L$) and can be used to find the length scale of the system. The cycle period ($c_p$) and the wiggle period ($w_p$) are used to estimate the length as follows using equations 4, 20 and 21.

$$c_p = \frac{\pi\sqrt{cr}}{\Delta L} \qquad 23$$

$$w_p = \frac{\pi\sqrt{cr}}{L^e} \qquad 24$$

Combining the above relations, the estimate for the length of the pile ($L^e$), measured from in between the sensor location to the tip of the pile, can be found.

$$L^e = \frac{c_p \Delta L}{w_p} \qquad 25$$

The above equation requires only the cycle period, wiggle period and the distance between the sensors to obtain an estimate for the length of the member. The material constants c and r are eliminated using the definition of theoretical wavenumber in equation 22 and are not required for estimating the length.

Figure 5:
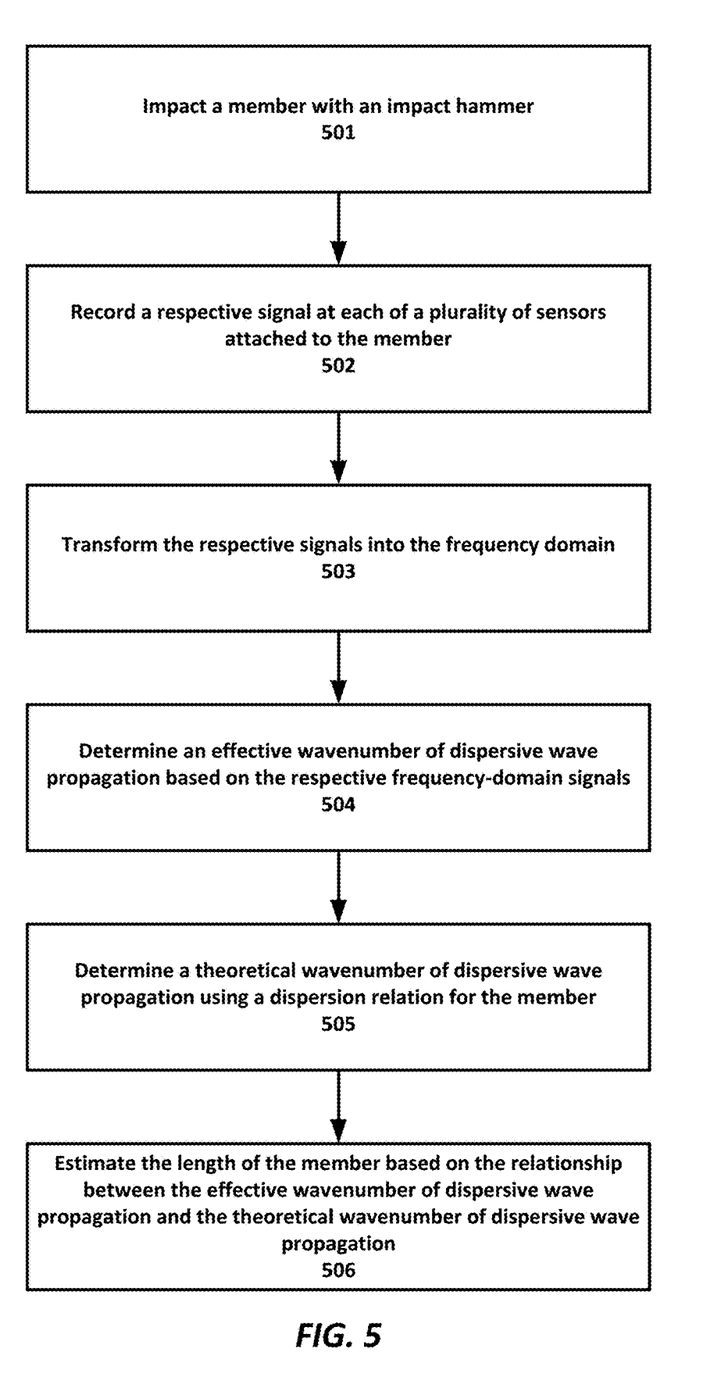
FIG. 5 is a flow chart illustrating example operations for non-destructively estimating a length of a member according to an implementation described herein.

Referring now to FIG. 5, a flow chart illustrating example operations for non-destructively estimating a length of a member is shown. At 501, a member (e.g., member 102 of FIG. 1) is impacted with an impact hammer (e.g., impact hammer 101 of FIG. 1). At 502, a respective signal is recorded at each of a plurality of sensors (e.g., sensors 103 of FIG. 1) attached to the member. As described herein, the respective signals can include dispersive waves generated by the impact. The respective signals can be converted from analog to digital signals, for example, using a DAQ (e.g., DAQ 104 of FIG. 1), and communicated to a computing device (e.g., computing device 105 of FIG. 1) for further processing. At 503, the respective signals are transformed into a frequency domain, for example, by Fourier transform. At 504, an effective wavenumber of dispersive wave propagation is determined based on the respective frequency-domain signals. The cycle period can be obtained through the definition of effective wavenumber as phase difference in equation 7. The wiggle period can be obtained through alternative definitions of the effective wavenumber (e.g., the phase measures such as actual phase, phase sum, or any combination of phases obtained from the frequency domain of the response signals) or as phase difference in equation 7. At 505, a theoretical wavenumber of dispersive wave propagation is determined using a dispersion relation for the member such as equation 4 obtained from BE beam theory. It should be understood that equation 4 (arising from BE beam theory) is only provided as an example dispersion relation. This disclosure contemplates that EDAR is applicable for any mathematical model that lends itself to a dispersion relation of the form, $$k=f(\omega), \qquad 26$$

where k is the wavenumber, ω is the frequency and $f$ is the function defining the relation between the two. In other words, the dispersion relation can arise from any mathematical model that relates wavenumber (k) to frequency (ω). Other examples of mathematical models for use with the techniques described herein include, but are not limited to, Timoshenko beam and waveguide models. Optionally, in some implementations, the member can be at least partially embedded, for example, in a formation such as soil. Optionally, the dispersion relation for the embedded member can account for a formation at least partially surrounding the embedded member. At 506, the length of the member is estimated based on the relationship between the effective wavenumber of dispersive wave propagation and the theoretical wavenumber of dispersive wave propagation.

It should be appreciated that the logical operations described herein with respect to the various figures may be implemented (1) as a sequence of computer implemented acts or program modules (i.e., software) running on a computing device (e.g., the computing device described in FIG. 6), (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

Figure 6:
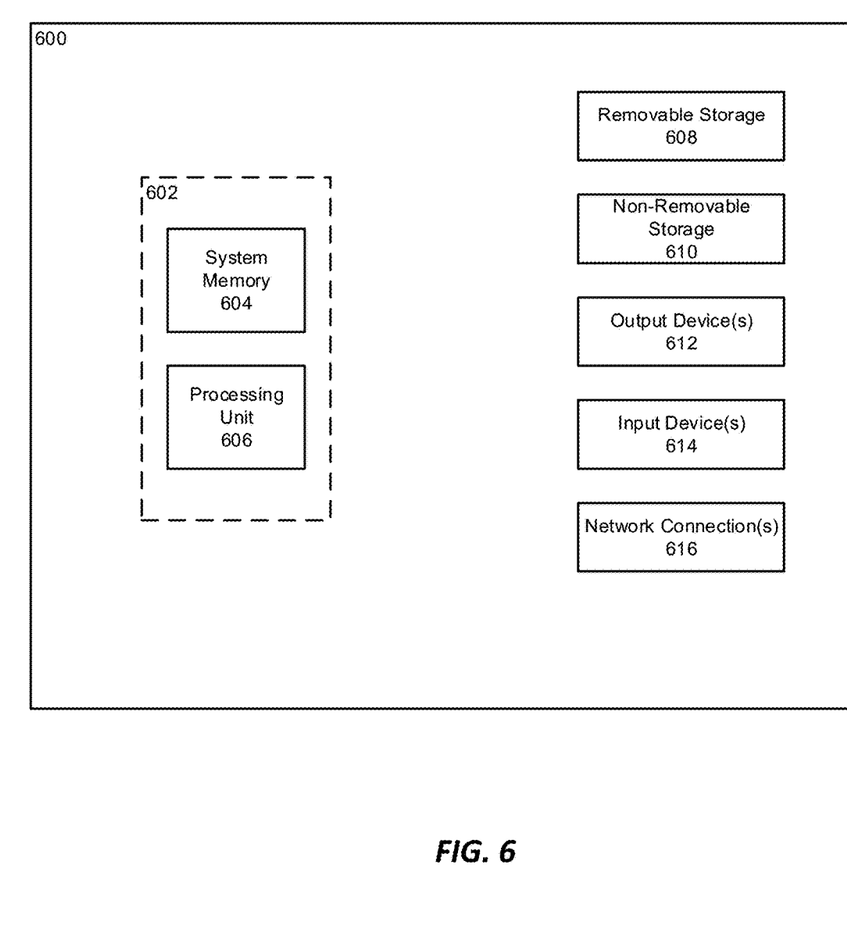
FIG. 6 is an example computing device.

Referring to FIG. 6, an example computing device 600 upon which embodiments of the invention may be implemented is illustrated. It should be understood that the example computing device 600 is only one example of a suitable computing environment upon which embodiments of the invention may be implemented. Optionally, the computing device 600 can be a well-known computing system including, but not limited to, personal computers, servers, handheld or laptop devices, multiprocessor systems, microprocessor-based systems, network personal computers (PCs), minicomputers, mainframe computers, embedded systems, and/or distributed computing environments including a plurality of any of the above systems or devices. Distributed computing environments enable remote computing devices, which are connected to a communication network or other data transmission medium, to perform various tasks. In the distributed computing environment, the program modules, applications, and other data may be stored on local and/or remote computer storage media.

In its most basic configuration, computing device 600 typically includes at least one processing unit 606 and system memory 604. Depending on the exact configuration and type of computing device, system memory 604 may be volatile (such as random access memory (RAM)), non-volatile (such as read-only memory (ROM), flash memory, etc.), or some combination of the two. This most basic configuration is illustrated in FIG. 6 by dashed line 602. The processing unit 606 may be a standard programmable processor that performs arithmetic and logic operations necessary for operation of the computing device 600. The computing device 600 may also include a bus or other communication mechanism for communicating information among various components of the computing device 600.

Computing device 600 may have additional features/functionality. For example, computing device 600 may include additional storage such as removable storage 608 and non-removable storage 610 including, but not limited to, magnetic or optical disks or tapes. Computing device 600 may also contain network connection(s) 616 that allow the device to communicate with other devices. Computing device 600 may also have input device(s) 614 such as a keyboard, mouse, touch screen, etc. Output device(s) 612 such as a display, speakers, printer, etc. may also be included. The additional devices may be connected to the bus in order to facilitate communication of data among the components of the computing device 600. All these devices are well known in the art and need not be discussed at length here.

The processing unit 606 may be configured to execute program code encoded in tangible, computer-readable media. Tangible, computer-readable media refers to any media that is capable of providing data that causes the computing device 600 (i.e., a machine) to operate in a particular fashion. Various computer-readable media may be utilized to provide instructions to the processing unit 606 for execution. Example tangible, computer-readable media may include, but is not limited to, volatile media, non-volatile media, removable media and non-removable media implemented in any method or technology for storage of information such as computer readable instructions, data structures, program modules or other data. System memory 604, removable storage 608, and non-removable storage 610 are all examples of tangible, computer storage media. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In an example implementation, the processing unit 606 may execute program code stored in the system memory 604. For example, the bus may carry data to the system memory 604, from which the processing unit 606 receives and executes instructions. The data received by the system memory 604 may optionally be stored on the removable storage 608 or the non-removable storage 610 before or after execution by the processing unit 606.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

EXAMPLES

Figure 7:
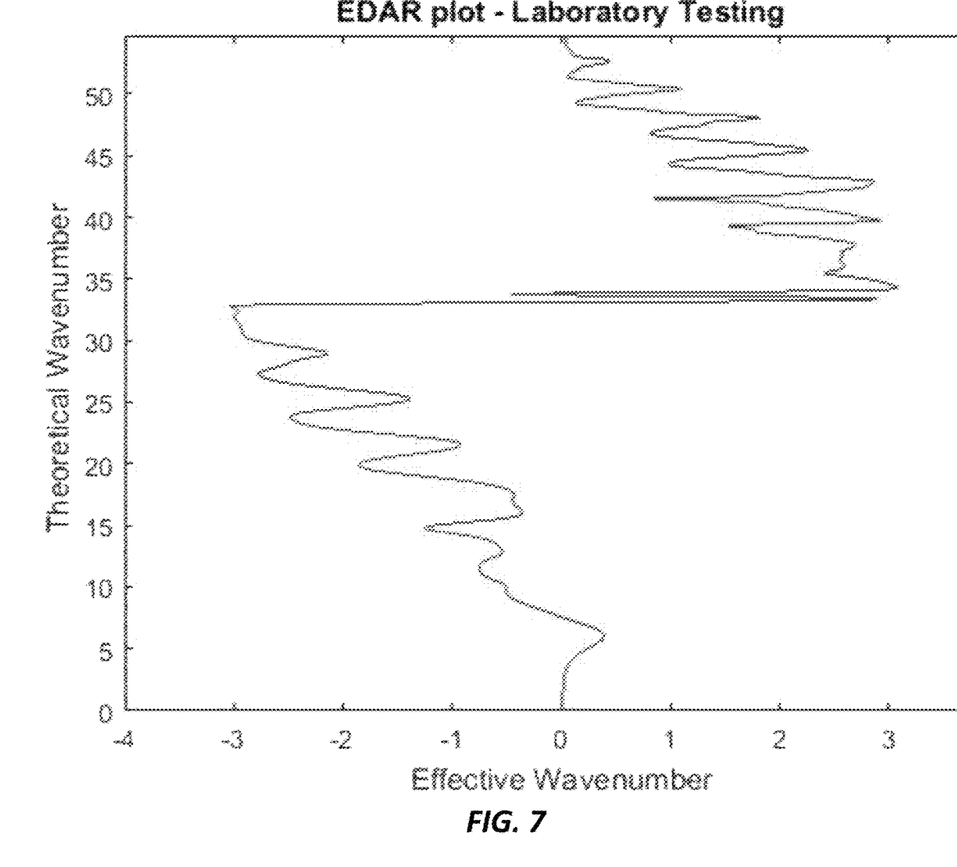
FIG. 7 is an EDAR plot obtained from testing an embedded member (pile foundation) in laboratory conditions in an example described herein.

Controlled experiments have been performed in the laboratory to estimate the embedded length of pile foundations. Representative results are shown below to illustrate the EDAR method described herein and its accuracy. Controlled laboratory tests were performed using the pile installed at NCSU-CFL. FIG. 7 is an EDAR plot obtained from the laboratory tests performed using the pile installed at NCSU-CFL. The effective wavenumber and theoretical wavenumber are defined using equations 5 and 22. Table 1 below shows the result of length estimation of the pile installed at NCSU-CFL.

TABLE 1

| Length estimation using EDAR | | | | | |
|---|---|---|---|---|---|
| Cycle Period | Wiggle Period | Sensor Distance (m) | Predicted Length (m) | Actual Length (m) | Error |
| 33.13 | 3.87 | .6096 | 6.13 | 5.92 | 3.6% |

The frequency content of the waves generated from lateral impact are an important factor that plays an important role in the unfolding of the EDAR method. Whenever the wavelengths produced are larger than the characteristic dimension of the pile cross-section (e.g., diameter for a cylindrical pile), the local effects are lesser and the Bernoulli-Euler beam model for slender beams works well and the estimates obtained based on this model have less error. In cases where higher frequencies are generated and wiggle and cycle periods are obtained from the higher wavenumber ranges, the length estimates obtained can have higher error percentages. The higher error can be rectified by incorporating higher order beam models such as the Timoshenko beam model, which incorporates shear deformation that is significant for higher frequencies (thus lower wavelengths). More sophisticated analysis based on guided wave theory can be used in case of even higher frequencies. EDAR methods can easily incorporate these higher order models by essentially modifying the dispersion relation and thus the definition of the theoretical wavenumber in equation 22. As described herein, the member (e.g., pile) can optionally be at least partially embedded, for example, in a formation such as soil. In addition, the effect of the soil surrounding the embedded pile can also be included in the EDAR approach. This can be achieved by modifying the dispersion relation, which can be done either through approximate semi-analytical methods, or more robust embedded waveguide modeling.

CONCLUSION

A technique called EDAR as described herein has been used to estimate the embedded length of pile foundations. The technique is based on recording the flexural waves generated from impact at select locations along the length of a pile, using accelerometers, and specially processing the data using the dispersion properties of the wave propagation medium. The technique has been verified theoretically and validated using laboratory tests. Even though the technique was used in the examples described herein to estimate the embedded length of pile foundations, this disclosure contemplates using it in other systems which might require nondestructive evaluation to estimate the length of a member (e.g., other embedded or non-embedded members).

EDAR offers an improved length estimation technique as compared to known non-destructive evaluation methods. As discussed above, pulse-echo, impact-echo, sonic-echo and related methods analyze longitudinal waves as opposed to dispersive flexural waves. These methods have disadvantages including, but not limited to, wave velocity assumptions that introduce significant errors and the need to access of the top of a member. Other methods such as SKM analyze dispersive flexural waves. According to SKM, a short kernel plot is obtained, which includes data centered around a particular frequency (e.g., dominant frequency). Using the resulting short-kernel plot, SKM determines the travel time between sensors and the travel time between the tip of the member and a sensor to calculate the length of the member. SKM is less accurate than the EDAR technique described herein because of SKM incorrectly assumes constant wave velocity. The short-kernel plot still has a range of frequencies over which the wave velocity changes significantly, causing SKM to result in significant errors in length estimates. On the other hand, EDAR includes the complete dispersion properties across the entire frequency range to calculate the length. EDAR transforms the response obtained at the two accelerometer locations to a wavenumber domain, incorporating the dispersion relation of the member, i.e., the relationship between wavenumber and frequency. EDAR essentially eliminates the underlying assumption of constant wave velocity, leading to superior accuracy in estimated length.

REFERENCES

1. ASCE 2017 report card for America's Infrastructure, available at http://www.infrastructurereportcard.org/wp-content/uploads/2017/04/2017-IRC-Executive-Summary-FINAL-FINAL.pdf
2. Rausche, Frank. "Non-destructive evaluation of deep foundations." (2004).
3. Levy, J. F. "Sonic pulse method of testing cast-in-situ piles." Ground Engng3 (1970): 17-19.
4. Davis, Allen G., and C. S. Dunn. "From theory to field experience with the non-destructive vibration testing of piles." Proceedings of the Institution of Civil Engineers 57, no. 4 (1974): 571-593.
5. Rausche, Frank, George G. Goble, and Garland E. Likins Jr. "Dynamic determination of pile capacity." Journal of Geotechnical Engineering 111, no. 3 (1985): 367-383.
6. Rauschel, Frank, Garland E. Likinsz, and Mohamed Husseiu. "PILE INTEGRITY BY LOU AND HIGH STRAIN IMPACTS." (1988).
7. Davis, Allen G. "Nondestructive evaluation of existing deep foundations." Journal of performance of constructed facilities 9, no. 1 (1995): 57-74.
8. Rausche, F., M. Hussain, and M. Bixler. "NON-DESTRUCTIVE TESTING TO DETERMINE UNKNOWN PILE LENGTHS UNDER EXISTING BRIDGES." In First International Conference on Scour of Foundations. 2002.
9. Lugovtsova, Y. D., and A. I. Soldatov. "Comparison of Three Different Methods for Pile Integrity Testing on a Cylindrical Homogeneous Polyamide Specimen." In Journal of Physics: Conference Series, vol. 671, no. 1, p. 012055. IOP Publishing, 2016.
10. Hertlein, Bernard, and William Walton. "Assessment and reuse of old foundations." Transportation Research Record: Journal of the Transportation Research Board 1736 (2000): 48-52.
11. Gorzelanczyk, Tomasz, Lukasz Sadowski, and Krzysztof Schabowicz. "Non-destructive evaluation of the concrete prefabricated pile length using impulse response S'MASH." Institute of Building Engineering, Wroclaw University of Technology, Wroclaw, Poland (2008).
12. Hussein, Mohamad, Garland Likins, and G. Goble. "Determination of Pile Lengths under Existing Structures." In Proceedings, 17th Annual Members Conference of the Deep Foundations Institute, New Orleans. 1992.
13. Raparelli, R. Q., and L. D. Olson. "Determination of Unknown Bridge Foundation Depths with NDE Methods." In The 82nd Annual Meeting of the Transportation Research Board, Washington, D.C. 2003.
14. Douglas, R. A., and Holt J. D., "Determining Length of Installed Timber Pilings by Dispersive Wave Propagation Methods." (1994). Research Project No. 23241-92-2
15. Farid, Ahmed. "Prediction of unknown deep foundation lengths using the Hilbert Huang Transform (HHT)." HBRC Journal 8, no. 2 (2012): 123-131.
16. Subhani, M., J. Li, B. Samali, and N. Yan. "Determination of the embedded lengths of electricity timber poles utilising flexural wave generated from impacts." Australian Journal of Structural Engineering 14, no. 1 (2013): 85.
17. Lo, Kuo-Feng, Sheng-Huoo Ni, and Yan-Hong Huang. "Non-destructive test for pile beneath bridge in the time, frequency, and time-frequency domains using transient loading." Nonlinear Dynamics 62, no. 1-2 (2010): 349-360.
18. Finno, Richard J. "1-D wave propagation techniques in foundation engineering." In The Art of Foundation Engineering Practice Congress, ASCE. 2010.
19. Hanifah, Abdul Aziz. A theoretical evaluation of guided waves in deep foundations. 1999. PhD Thesis. Northwestern University. Evaneston. Ill.
20. Chao, H. C. "An Experimental Model for Pile Integrity Evaluation using a Guided Wave Approach." Northwestern University (2002).
21. Wang, Helsin. "Theoretical evaluation of embedded plate-like and solid cylindrical concrete structures with guided waves." PhD diss., Northwestern University, 2004.
22. Lynch Jr, James J. "Experimental verification of flexural guided waves in concrete cylindrical piles." PhD diss., NORTHWESTERN UNIVERSITY, 2007.
23. Kuo, Kirsty A., and Hugh EM Hunt. "Dynamic Models of Piled Foundations." Applied Mechanics Reviews 65, no. 3 (2013): 031003.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A non-destructive method for estimating a length of a member, comprising:
    impacting the member;
    recording a respective signal at each of a plurality of sensors attached to the member, the respective signals comprising dispersive waves generated by the impact;
    transforming the respective signals into a frequency domain;
    determining an effective wavenumber of dispersive wave propagation based on the respective frequency-domain signals;
    determining a theoretical wavenumber of dispersive wave propagation using a dispersion relation for the member as a function of frequency; and
    estimating the length of the member based on the relationship between the effective wavenumber of dispersive wave propagation and the theoretical wavenumber of dispersive wave propagation.

2. The non-destructive method of claim 1, wherein the relationship between the effective wavenumber of dispersive wave propagation and the theoretical wavenumber of dispersive wave propagation is approximately periodic on a plurality of scales.

3. The non-destructive method of claim 1, wherein estimating the length of the member further comprises calculating a cycle period and a wiggle period based on the relationship between the effective wavenumber of dispersive wave propagation and the theoretical wavenumber of dispersive wave propagation.

4. The non-destructive method of claim 3, wherein the cycle period and the wiggle period are calculated from a plot of the relationship between the effective wavenumber of dispersive wave propagation and the theoretical wavenumber of dispersive wave propagation.

5. The non-destructive method of claim 3, wherein the cycle period is a period between groups of wiggles.

6. The non-destructive method of claim 3, wherein the cycle period is related to a distance between the sensors.

7. The non-destructive method of claim 3, wherein the wiggle period is a period between wiggle peaks.

8. The non-destructive method of claim 3, wherein the wiggle period is related to a distance between a tip of the member and at least one of the sensors.

9. The non-destructive method of claim 3, wherein the length is estimated based on the cycle period, the wiggle period, and a distance between the sensors.

10. The non-destructive method of claim 1, wherein the effective wavenumber of dispersive wave propagation is determined from a phase measure related to a real wavenumber and a distance between the sensors.

11. The non-destructive method of claim 1, wherein the dispersion relation for the member comprises a Bernoulli-Euler beam model, a Timoshenko beam model, or a waveguide model.

12. The non-destructive method of claim 1, wherein the member is at least partially embedded.

13. The non-destructive method of claims 12, wherein the dispersion relation for the embedded member accounts for a formation at least partially surrounding the embedded member.

14. The non-destructive method of claim 1, wherein at least one of the sensors is an accelerometer or a geophone.

15. A system for non-destructive estimation of a length of a member, comprising:
   an impact hammer;
   a plurality of sensors attached to the member; and
   a computing device operably connected to the sensors, the computing device comprising a processor and a memory operably connected to the processor, wherein the memory has computer-executable instructions stored thereon that, when executed by the processor, cause the processor to:
      receive a respective signal recorded at each of the sensors, the respective signals comprising dispersive waves generated by impact between the impact hammer and the member;
      transform the respective signals into a frequency domain;
      determine an effective wavenumber of dispersive wave propagation based on the respective frequency-domain signals;
      determine a theoretical wavenumber of dispersive wave propagation using a dispersion relation for the member as a function of frequency; and
      estimate the length of the member based on the relationship between the effective wavenumber of dispersive wave propagation and the theoretical wavenumber of dispersive wave propagation.

16. The system of claim 15, wherein the system is portable.

17. The system of claim 15, wherein the member is at least partially embedded.

18. The system of claim 15, wherein at least one of the sensors is an accelerometer or a geophone.

19. The system of claim 15, wherein the dispersion relation for the member comprises a Bernoulli-Euler beam model, a Timoshenko beam model, or a waveguide model.

20. A non-transitory computer-readable recording medium having computer-executable instructions stored thereon for estimation of a length of a member that, when executed by a computer, cause the computer to:
   receive a respective signal recorded at each of a plurality of sensors attached to the member, the respective signals comprising dispersive waves;
   transform the respective signals into a frequency domain;
   determine an effective wavenumber of dispersive wave propagation based on the respective frequency-domain signals;
   determine a theoretical wavenumber of dispersive wave propagation using a dispersion relation for the member as a function of frequency; and
   estimate the length of the member based on the relationship between the effective wavenumber of dispersive wave propagation and the theoretical wavenumber of dispersive wave propagation.

* * * * *